United States Patent [19]

Chappelear et al.

[11] Patent Number: 4,576,621

[45] Date of Patent: Mar. 18, 1986

[54] APPARATUS FOR PRODUCING CHOPPED STRANDS OF GLASS FIBERS

[75] Inventors: Robert N. Chappelear, Anderson; Alex P. Symborski, Pendleton, both of S.C.

[73] Assignee: Owens-Corning Fiberglas Corporation, Toledo, Ohio

[21] Appl. No.: 689,425

[22] Filed: Jan. 7, 1985

[51] Int. Cl.⁴ ............................................. C03B 37/16
[52] U.S. Cl. ...................................... 65/10.2; 83/344; 83/913
[58] Field of Search ....................... 65/2, 10.2; 83/344, 83/913

[56] References Cited

U.S. PATENT DOCUMENTS 3,508,461  4/1970  Stream .................................. 65/10.2
3,731,575  5/1973  Gelin ..................................... 83/344
4,194,896  3/1980  Symborski et al. ................. 65/2 X Primary Examiner—Robert Lindsay
Attorney, Agent, or Firm—Ronald C. Hudgens; Patrick P. Pacella; Greg Dziegielewski

[57] ABSTRACT

Apparatus for drawing molten streams of glass into filaments and severing the filaments into segments is provided wherein the cot wheel is eccentrically mounted to provide automatic micro-adjustment with respect to the cutter roll, and wherein the cutter roll is releasably secured to provide macro-adjustment to accomodate cot wheels of different diameters.

8 Claims, 4 Drawing Figures

APPARATUS FOR PRODUCING CHOPPED STRANDS OF GLASS FIBERS

TECHNICAL FIELD

The invention disclosed herein relates to the production of discrete segments of strands of glass fibers wherein the glass fibers are concomittantly drawn from molten streams of glass into continuous filaments and then severed into discrete segments through the action of the same apparatus.

BACKGROUND

In the production of "chopped strand", continuous bundles or strands of glass fibers or filaments are severed or "chopped" to produce the discrete segments of strand. In one well-known system, the glass filaments are drawn from streams of molten glass and directly chopped into discrete segments through the action of a single attenuation-severing means. For example, see U.S. Pat. No. 4,194,896 for one such system.

Such attenuation-severing means are generally comprised of a driven cot roll which first supplies the attenuative forces to draw the streams of molten glass into filaments and, secondly, functions as a bearing surface against which the blades of the cutter roll chop the continuous glass filaments into discrete segments. Generally, the circumferential surface of the cot roll has an elastomeric layer thereon to facilitate the attenuation and severing functions.

Further, the axis of rotation of the cot roll has generally been fixed, and the axis of rotation of the cutter roll has been laterally movable so that the force with which the cutter roll bears against the elastomeric surface of the cot roll is adjustable to compensate for part wear, among other reasons.

Historically, the adjustment mechanism for the cutter roll has been a "slide" type configuration with the mating slide surfaces, unfortunately, adjacent the rapidly rotating cutter and cot rolls. In such an environment, wherein the strands are generally coated with various liquid materials, the slide surfaces tended to collect various foreign materials and/or corrode as a result of contacting such coating material. Thus, the ability to adjust the cutter roll became increasingly difficult over the life of the chopper.

Since the elastomeric layer on the cot roll is generally relatively thin, the length of adjustment provided by the slide mechanism associated with the cutter roll was relatively short, notwithstanding the fact that the slide system associated with the cutter roll was relatively large in comparison. Thus, the ranges of diameters of the cutter roll and cot rolls associated with a given chopper were severely limited.

The present invention provides a system wherein the adjustment mechanism for increasing or decreasing the space between the axis of rotation of the cutter and cot rolls is positioned outside the zone immediately adjacent the rotating cutter and cot rolls which receives the spray of coating material from such rolls, and the present invention also provides a system wherein cot rolls may be employed having substantially different diameters, as well as cutter rolls of substantially different diameters.

DISCLOSURE OF THE INVENTION

This invention pertains to apparatus for drawing molten streams of glass into filaments and severing the filaments into discrete segments comprising: a first rotatable member secured to a shaft having an axis of rotation; a second rotatable member positioned adjacent said first member adapted to sever said filaments form said discrete segments as the filaments advance between the first and second rotatable members; means for rotating said first member to attenuate said streams into said filaments; a rotatable carriage means having an axis of rotation, the axis of rotation of said first rotatable member and shaft being spaced from the axis of rotation of said carriage; actuator means for rotating said carriage means to laterally move the axis of rotation of said first member along a predetermined path to change the distance between the axis of rotation of the first member and the axis of rotation of the second member.

BEST MODE OF CARRYING OUT THE INVENTION

Figure 1:
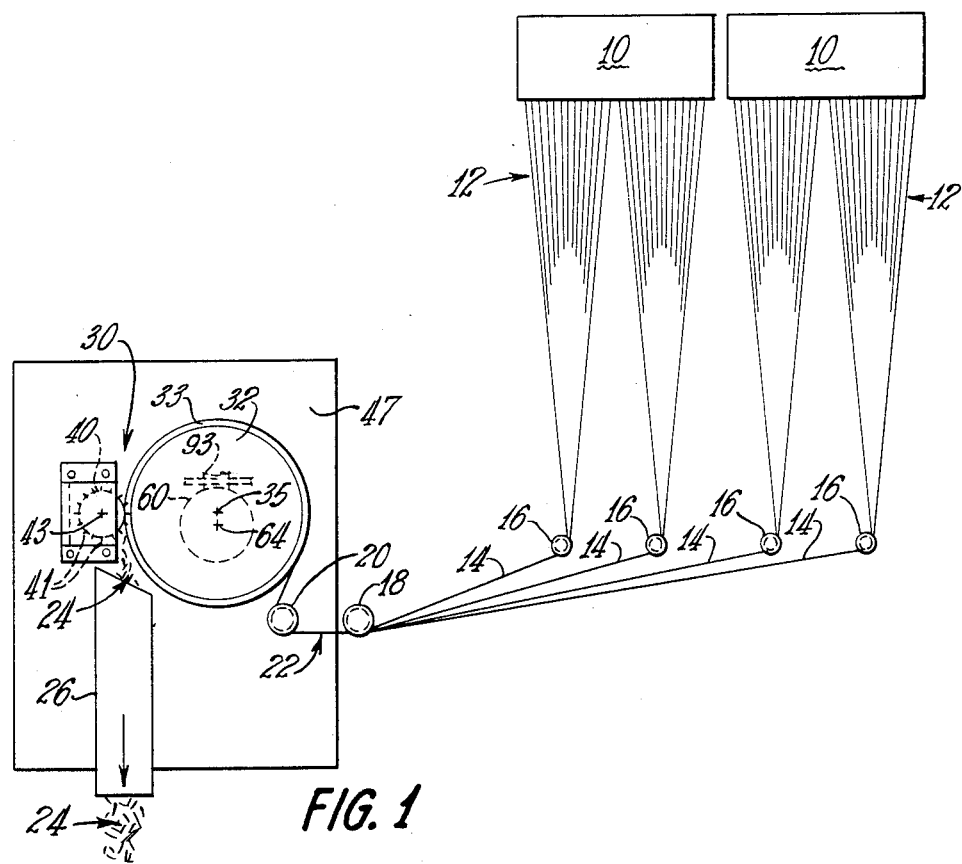
FIG. 1 is a semi-schematic, front elevational view of a chopped strand production system.

As shown in FIG. 1, a plurality of feeders 10 supply a plurality of streams of molten inorganic material such as glass, which are drawn into continuous filaments through the action of attenuation-severing means or assembly 30 as is known in the art. Groups of filaments 12 are gathered into strands 14 at gathering means or shoes 16. Strands 14 then advance directly in contact with idler rolls 18 and 20 which arrange the strands 14 as a planar band 22. Also, idler roll 20 serves to position the band of strands 22 over the desired arcuate portion of cot roll or first member 32.

First rotatable member 32 is driven by motor 36 as will be explained in detail later herein. As the bundles of glass filaments 14 pass between the nip of cutter roll or second rotatable member 40 and first member 32, the continuous strands 14 are severed or chopped into discrete segments 24 which are captured by collector or chute 26 as is known in the art.

According to the principles of this invention, the axis of rotation 35 of first rotatable member 32 is movable through an arc toward and away from second member or cutter roll 40 to, among other things, increase or decrease the amount of penetration of blades 41 of cutter roll 40 into the elastomeric layer 33 positioned around the circumference of first member or cot roll 32. As is known in the art, blades 41 may be aligned to radially project from the second member 40.

Desirably, the axis of rotation 43 of second member or cutter roll 40 is maintained substantially parallel to the axis of rotation 35 of first member or cot roll 32.

Figure 2:
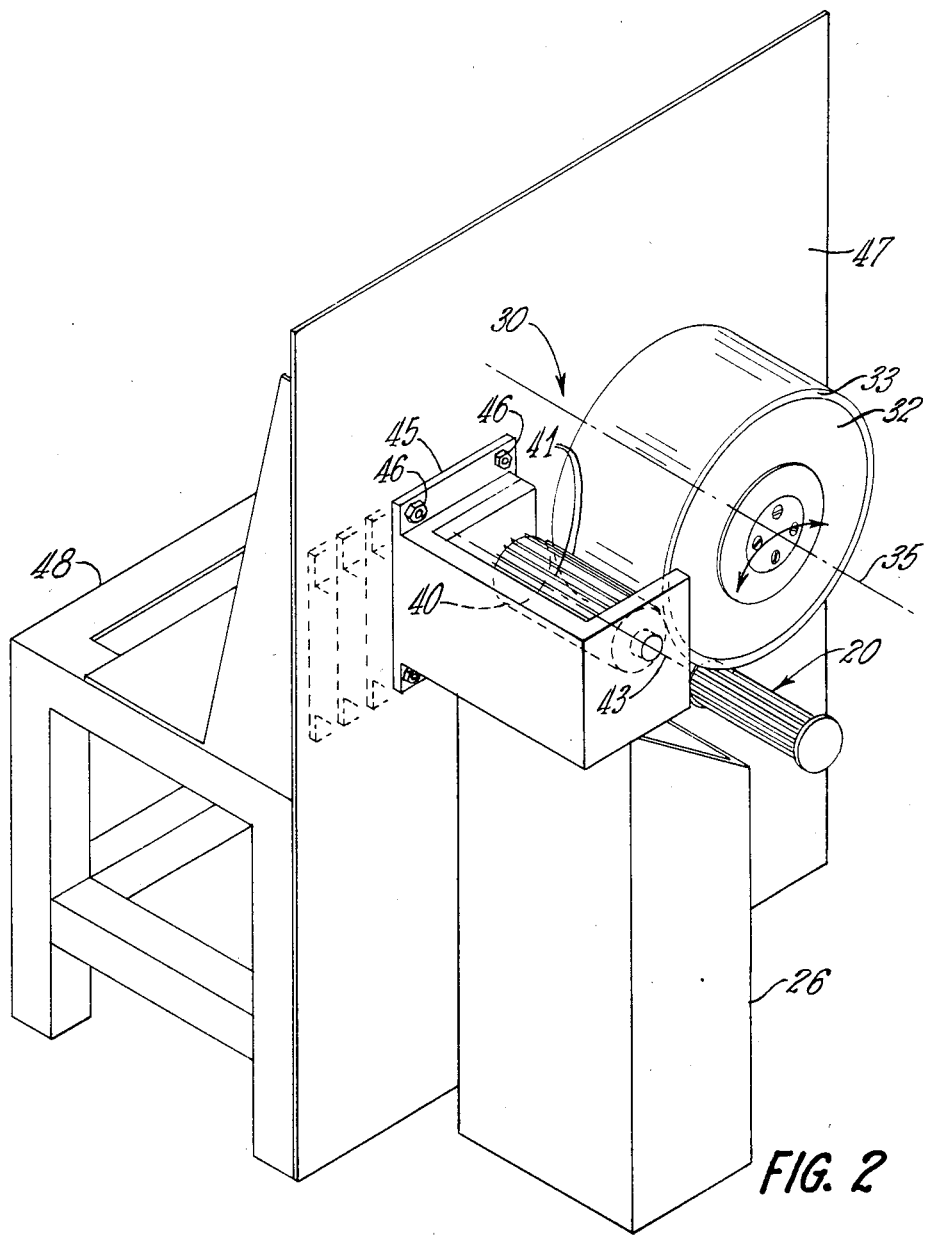
FIG. 2 is an enlarged, isometric view of the attenuation-severing means shown in FIG. 1.

In another aspect of the present invention, second member 40 is releasably secured to the housing or wall 47 of assembly 30 to permit macro-adjustment to be made between the axis of rotation 43 of second member 40 and the axis of rotation 35 of first member 32. Thus, cot rolls, as well as cutter rolls, of substantially different diameters may be accommodated. As shown in FIG. 2, second member 40 is rotatably journaled in a movable support 45 which is releasably secured to wall 47 by means of threaded fasteners 46.

Figure 4:
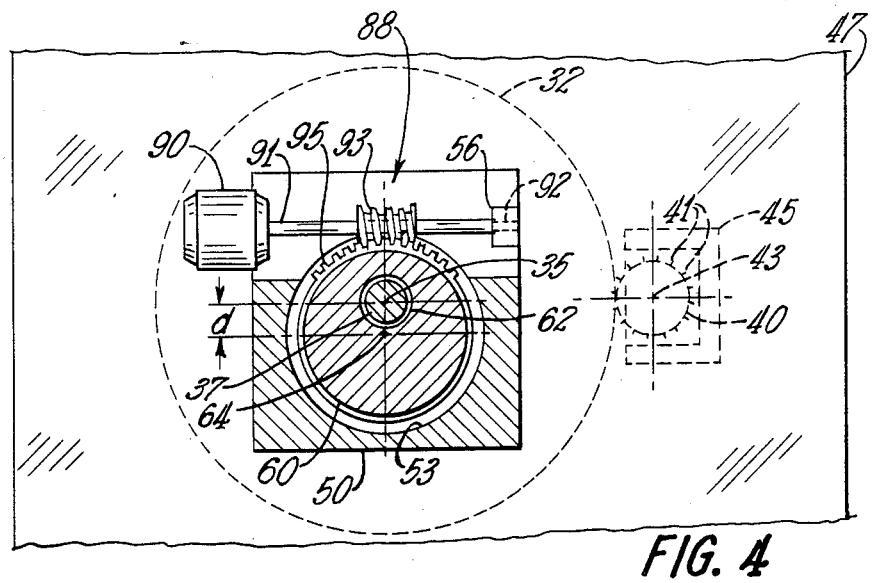
FIG. 4 is a rear view of the attenuation-severing means shown in FIG. 3 taken along view 4—4.

The eccentric, micro-adjustment of the axis of rotation 35 of first member 32 is provided through the cooperation of cradle 50 and carriage or trunnion 60. To provide the eccentric movement, the axis of rotation 35 of first member 32 is spaced from, but parallel to, the axis of rotation 64 of carriage 60. As shown in FIG. 4, the axis of rotation 35 is positioned above the axis of rotation 64 to provide the lateral movement of first member 32 relative to second member 40.

First member 32 is mounted upon shaft 37 which is journaled for rotation in bore 62 of carriage 60. Shaft 37 is driven by any suitable means such as motor 36 which is conveniently and preferably secured to carriage 60. Alternatively, shaft 37 may be coupled to a suitable motor by means of gears, pulleys, belts and the like, if desired.

Cradle 50 is secured to frame 48 of assembly 30. Carriage 60 includes a pair of braces or landings 66 and 67 adapted to fit within the bores 53 and 54 of cradle 50 to define the axis of rotation 64 of carriage 60. As shown in FIG. 4, the axis of rotation 35 of first member 32 and the axis of rotation 43 of second member 40 lie in approximately a common horizontal plane.

To prevent the debris and fluids from the forming and severing processes from fouling the cradle 50 and carriage 60, shaft 37 is provided with a seal 38 at wall 47 of assembly 30 to keep such fluid and debris out.

Figure 3:
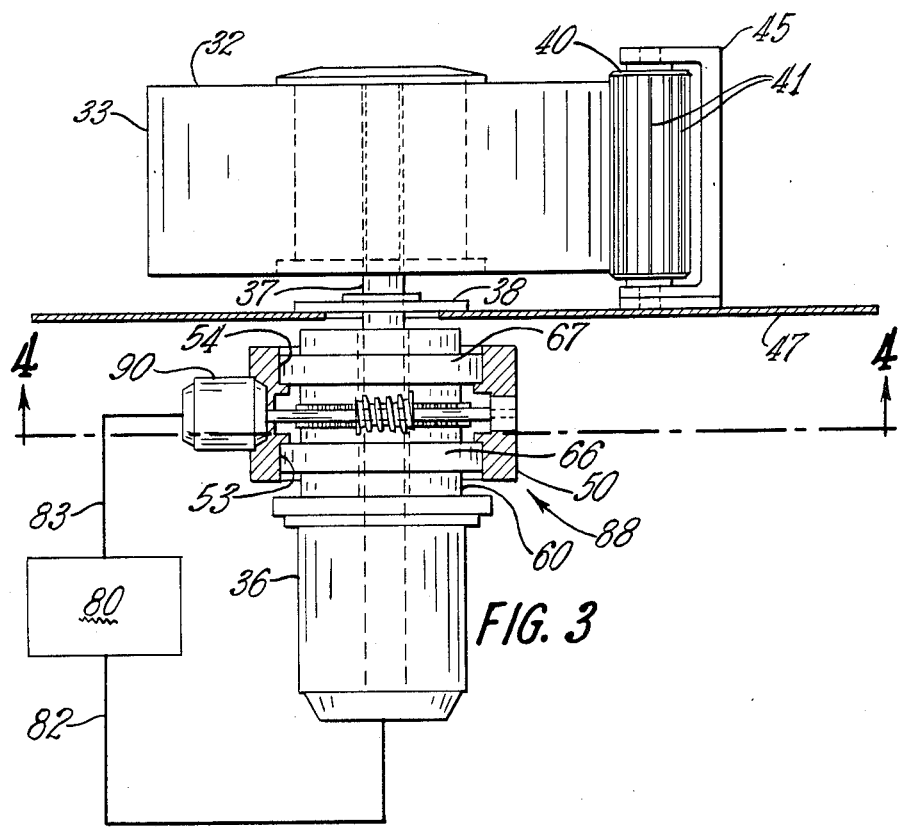
FIG. 3 is a plan view of a portion of the attenuation-severing means according to the principles of this invention.

Carriage 60 is rotated via indexing or actuator means 88. Actuator means 88 may be of any suitable type, manually or power driven. As shown in FIGS. 3 and 4, actuator means 88 is conveniently comprised of a motor 90 having an output shaft 91 upon which worm gear 93 is suitably fastened. Worm gear 93 meshes with worm rack 95 which is suitably fastened to carriage 60. As shown, motor 90 is secured to cradle 50, and the distal end 92 of output shaft 91 is journaled in seat 56 of cradle 50. Thus, when motor 90 is activated, worm gear 93 is rotated which, in turn, rotates worm rack and carriage 60, causing the axis of rotation 35 to be laterally moved along an arcuate path.

Actuator means 88 may be controlled to index carriage 60 a predetermined amount at predetermined times to automatically adjust for wear in the components of the system. Motor 90 of actuator means 88 may be simply connected with a suitable timer control to activate motor 90 according to a predetermined sequence as a function of time.

Alternatively, motor 90 may be interconnected with motor 36 by means of control means 80 via conventional electrical leads 82 and 83 to control the advancement of motor 90 in response to the speed of motor 36 and the running time of motor 36. Thus, motor 90 would be activated as a function of the speed of motor 36 as well as time. Of course, motor 90, in addition to being indexed as a step function, may be continuously advanced at a predetermined rate that may vary as a function of the aforementioned variables and the like.

It is apparent that within the scope of the invention, modifications and different arrangements can be made other than as herein disclosed. The present disclosure is merely illustrative with the invention comprehending all variations thereof.

INDUSTRIAL APPLICABILITY

The invention described herein is readily applicable to the glass fiber industry.

We claim:

1. Apparatus for drawing molten streams of glass into filaments and severing the filaments into discrete segments comprising:
   a first rotatable member having an axis of rotation;
   a second rotatable member positioned adjacent said first member adapted to sever said filaments to form said discrete segments as the filaments advance between the first and second rotatable members;
   means for rotating said first member about said axis to attenuate said streams into said filaments;
   a rotatable carriage means having an axis of rotation, the axis of rotation of said first rotatable member being spaced from the axis of rotation of said carriage;
   actuator means for rotating said carriage means to laterally move the axis of rotation of said first member along a predetermined path to increase or decrease the distance between the axis of rotation of the first member and the axis of rotation of the second member.

2. The apparatus of claim 1 wherein the axes of rotation of the first member, second member and carriage are substantially parallel to each other.

3. The apparatus of claim 1 wherein said actuator means is comprised of a motor connected to a worm gear associated with a worm rack fastened to said carriage.

4. The apparatus of claim 1 wherein said means for rotating said first member is a motor fastened to said carriage, said motor being coupled to a shaft secured to said first rotatable member.

5. The apparatus of claim 1 wherein the axis of rotation of said second rotatable member is also laterally movable.

6. The apparatus of claim 1 further comprising a control means for automatically activating said actuator means.

7. The apparatus of claim 6 wherein said control means is adapted to activate said actuator means at predetermined intervals.

8. The apparatus of claim 6 wherein said control means is adapted to continuously advance said actuator means according to predetermined parameters.

* * * * *